(12) United States Patent
Fujii et al.

(10) Patent No.: US 10,244,158 B2
(45) Date of Patent: Mar. 26, 2019

(54) IMAGING CONTROL DEVICE, IMAGING DEVICE, AND IMAGING CONTROL METHOD

(71) Applicant: SONY CORPORATION, Tokyo (JP)

(72) Inventors: Shinichi Fujii, Kanagawa (JP); Daisuke Miyakoshi, Kanagawa (JP); Kenzaburo Seki, Kanagawa (JP); Mitsuaki Kita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/563,632

(22) PCT Filed: May 12, 2016

(86) PCT No.: PCT/JP2016/002341
§ 371 (c)(1),
(2) Date: Oct. 2, 2017

(87) PCT Pub. No.: WO2016/199351
PCT Pub. Date: Dec. 15, 2016

(65) Prior Publication Data
US 2018/0077337 A1   Mar. 15, 2018

(30) Foreign Application Priority Data

Jun. 9, 2015   (JP) .................. 2015-116389

(51) Int. Cl.
*H04N 5/232*   (2006.01)
*H04N 5/345*   (2011.01)
*H04N 5/369*   (2011.01)

(52) U.S. Cl.
CPC ......... *H04N 5/23212* (2013.01); *H04N 5/345* (2013.01); *H04N 5/3456* (2013.01); *H04N 5/3696* (2013.01)

(58) Field of Classification Search
CPC ... H04N 5/23212; H04N 5/345; H04N 5/3696
See application file for complete search history.

(56) References Cited

U.S. PATENT DOCUMENTS

| 2007/0126909 | A1  | 6/2007  | Kuruma |
| 2009/0086084 | A1  | 4/2009  | Komaba et al. |
| 2012/0105688 | A1* | 5/2012  | Kita ............... H04N 5/359 348/242 |
| 2013/0258149 | A1  | 10/2013 | Choi et al. |
| 2015/0156428 | A1  | 6/2015  | Uchida |

FOREIGN PATENT DOCUMENTS

EP   1 791 344 A2   5/2007

OTHER PUBLICATIONS

International Search Report and Written Opinion dated Jul. 12, 2016 in PCT/JP2016/002341, 9 pages.

* cited by examiner

*Primary Examiner* — Teyler L Haskins
*Assistant Examiner* — Fayez Bhuiyan
(74) *Attorney, Agent, or Firm* — Oblon, McClelland, Maier & Neustadt, L.L.P.

(57) ABSTRACT

There is provided an image sensor including: a control unit configured to control pixels in a manner that a readout of a focus pixel signal from a focus detection pixel used for focusing and a readout of a main pixel signal from a pixel used for image generation are conducted independently; and an output unit configured to output the focus pixel signal and the main pixel signal independently from each other.

12 Claims, 10 Drawing Sheets

[Fig. 1]
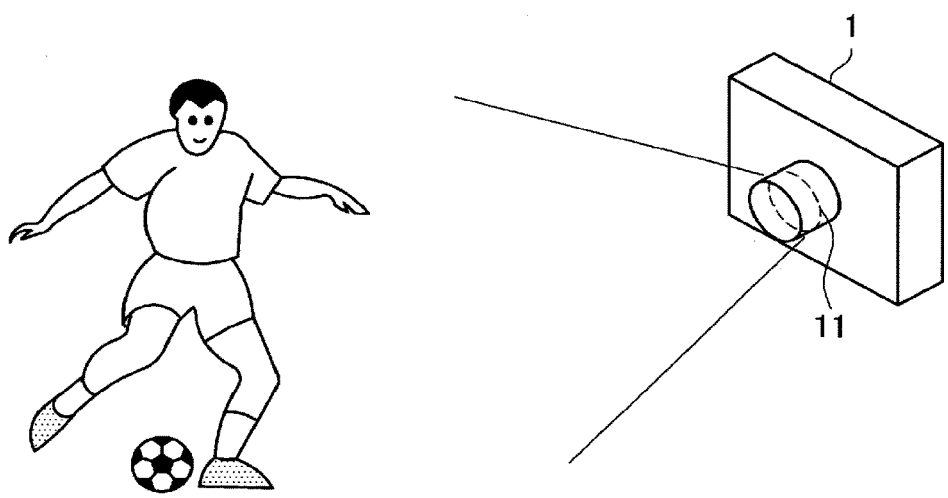
[Fig. 2]
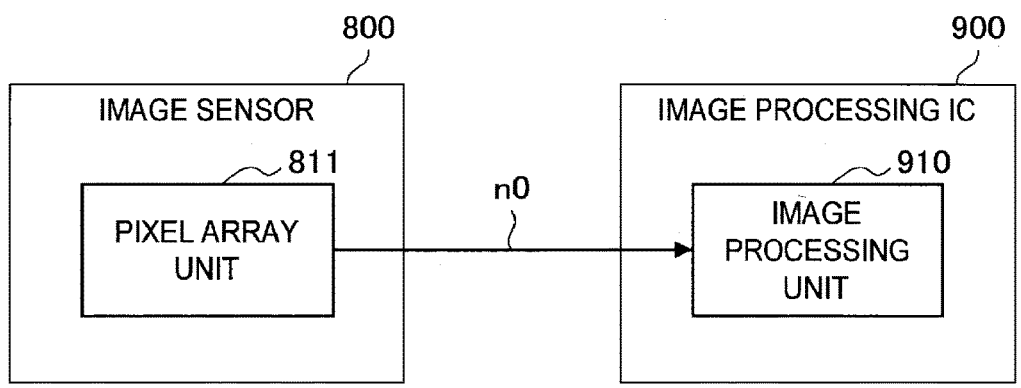

[Fig. 3]
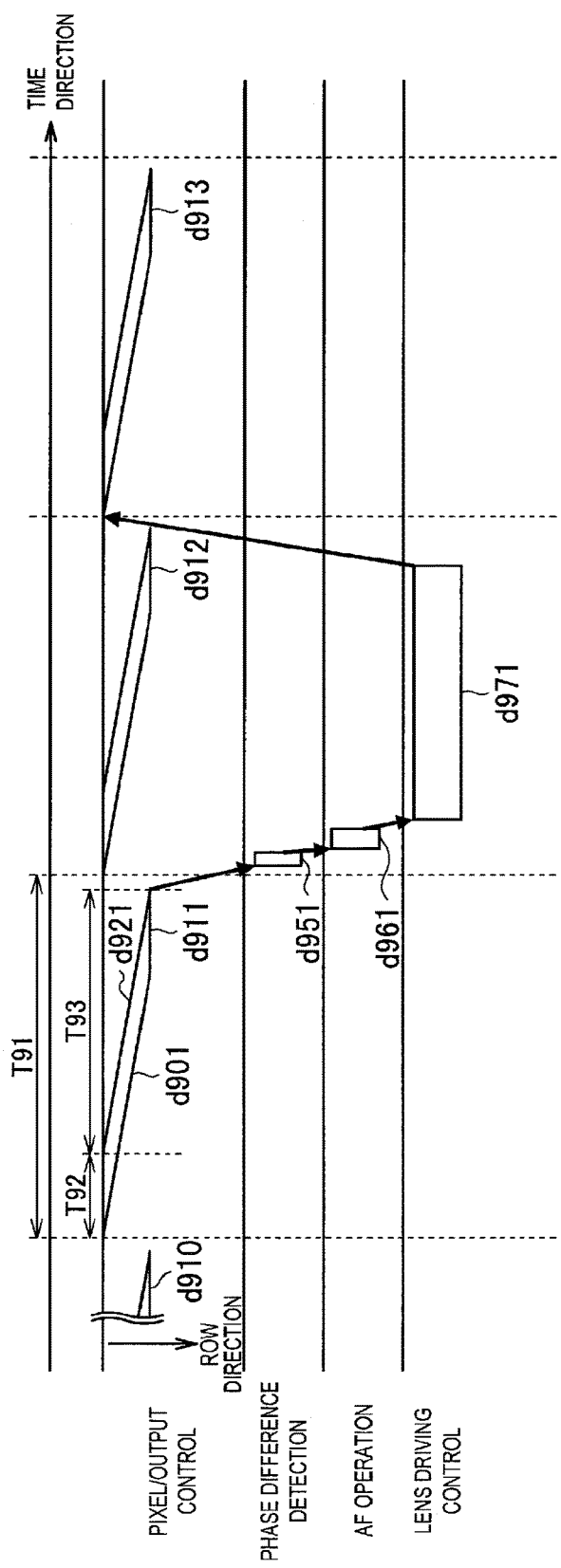

[Fig. 4]
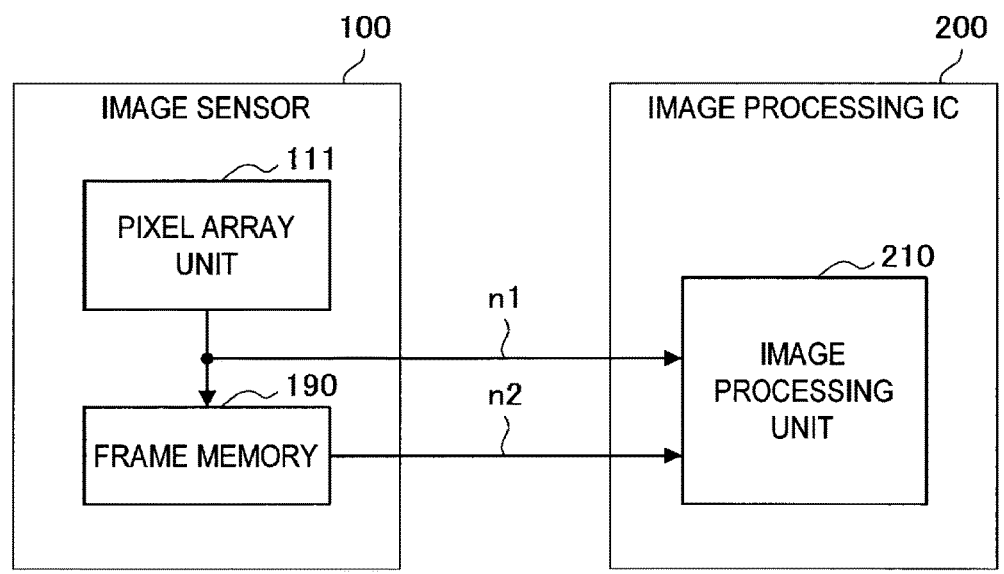

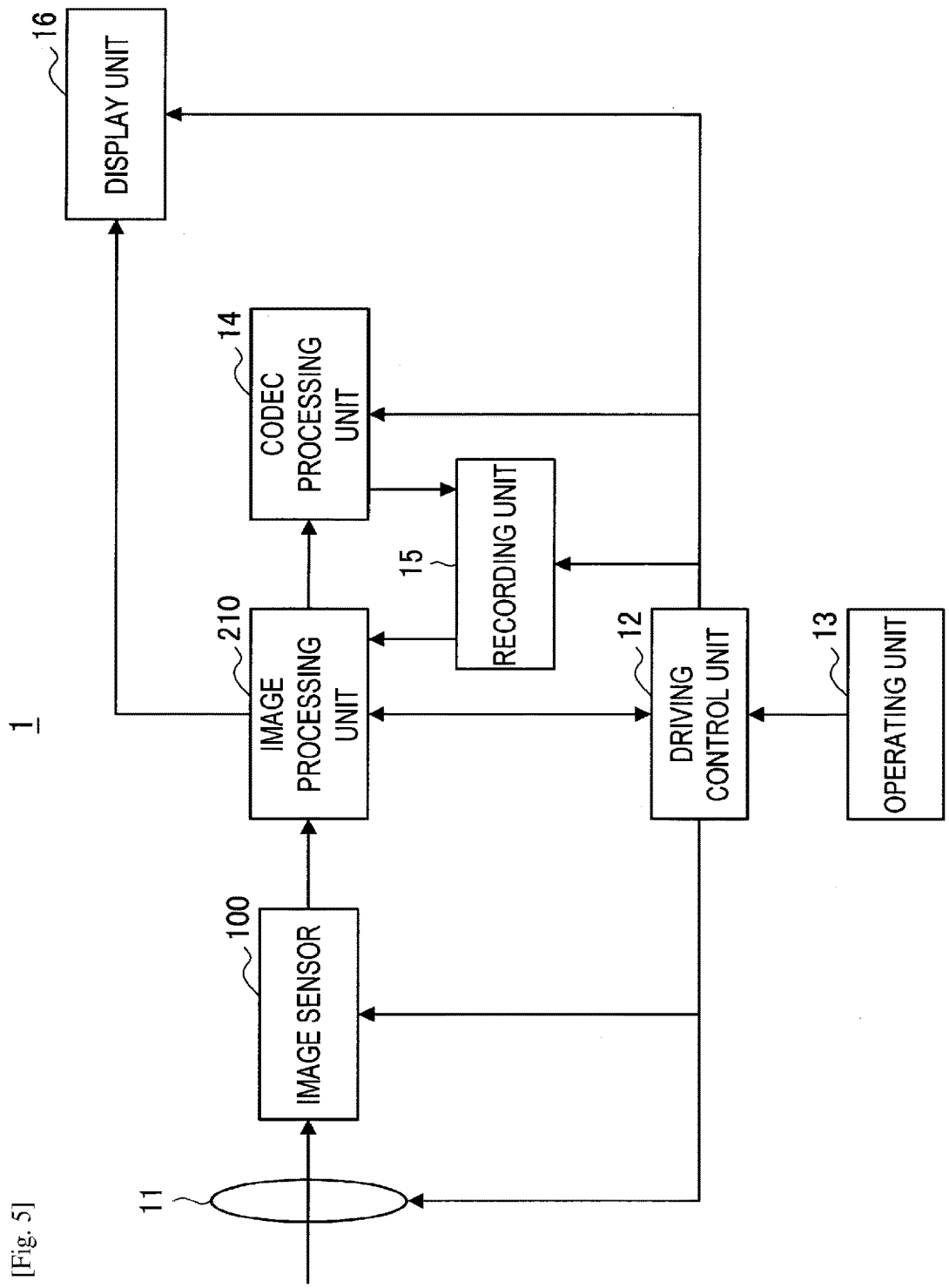
[Fig. 5]

[Fig. 6]
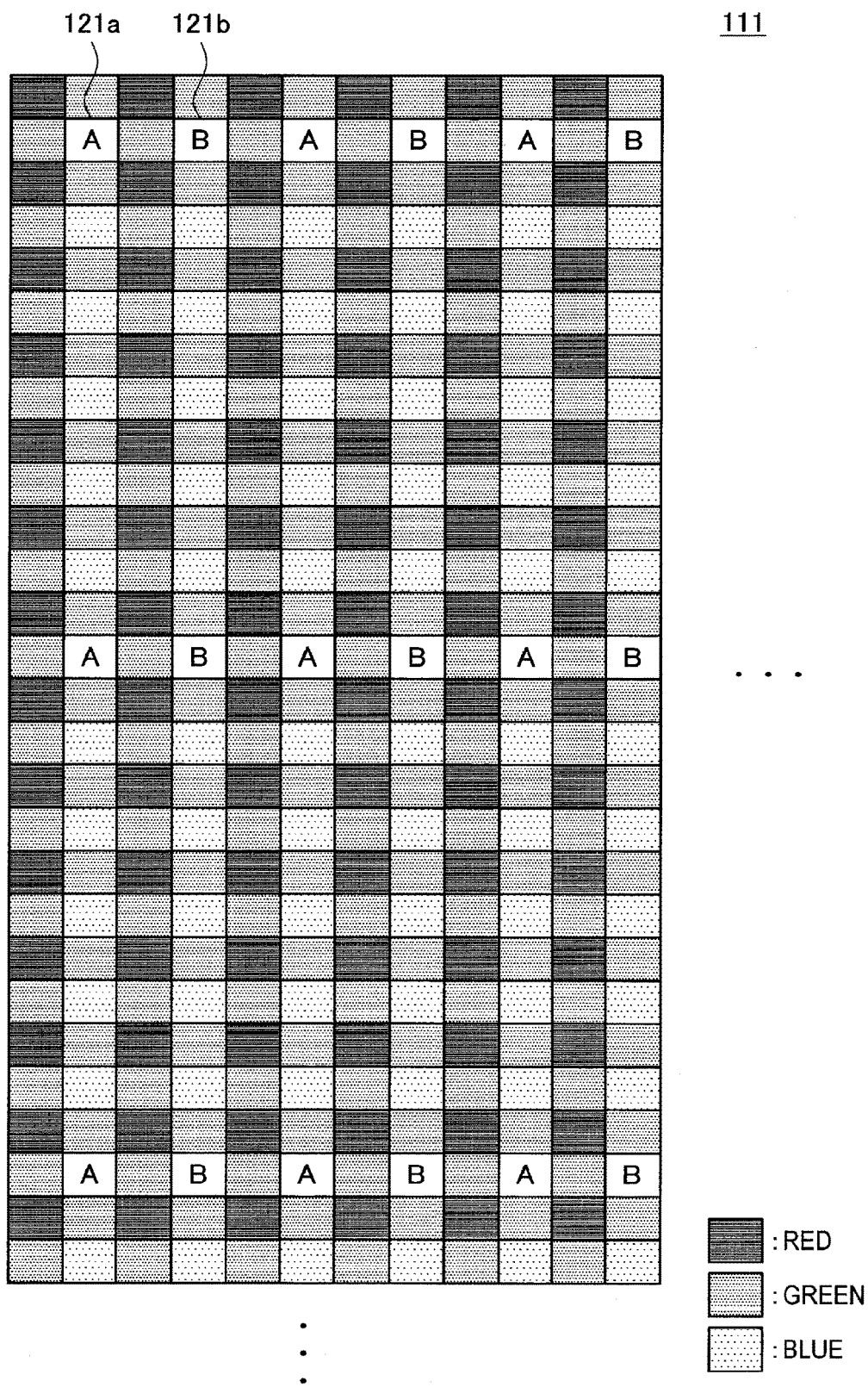

[Fig. 7]
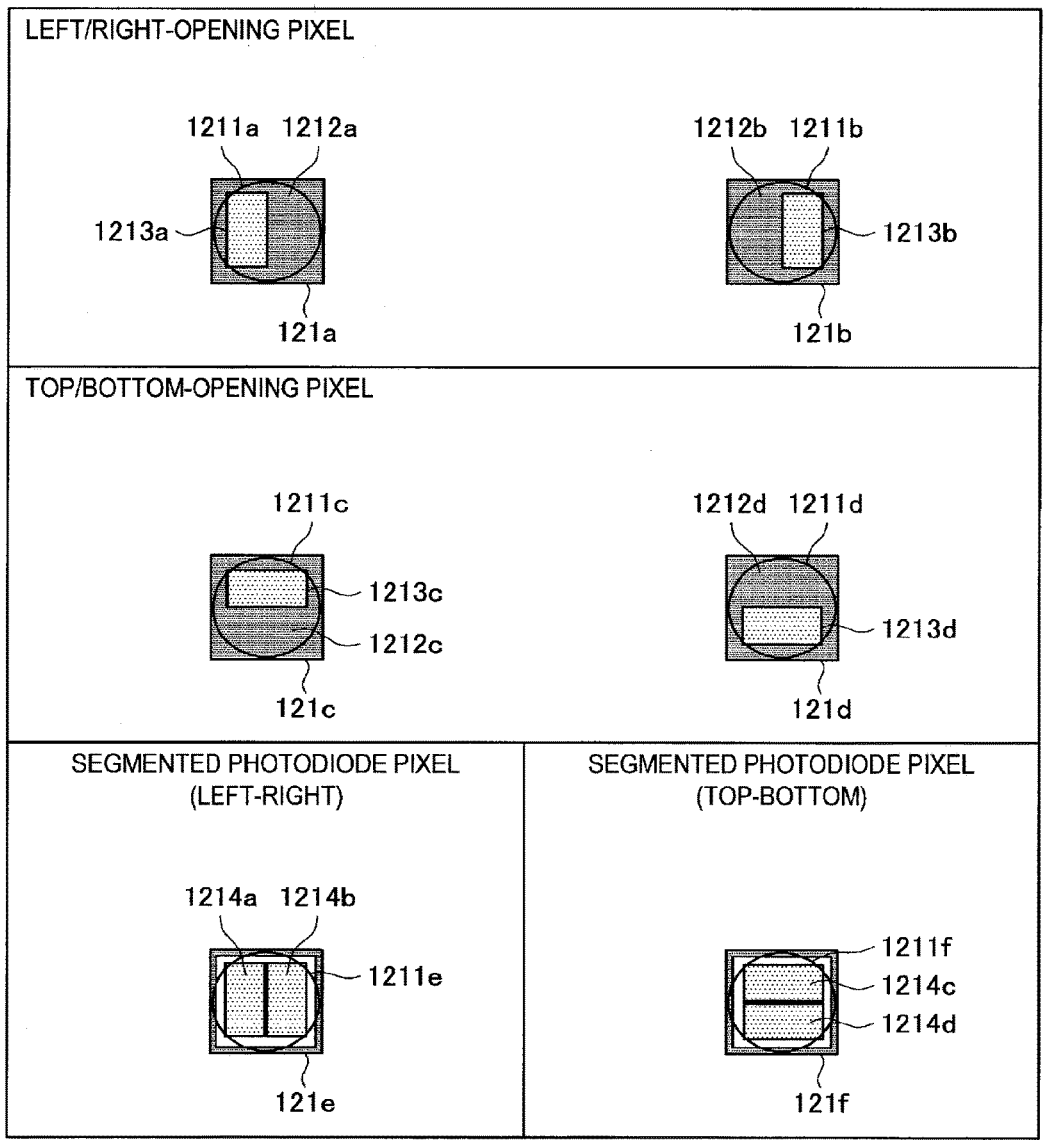

[Fig. 8]
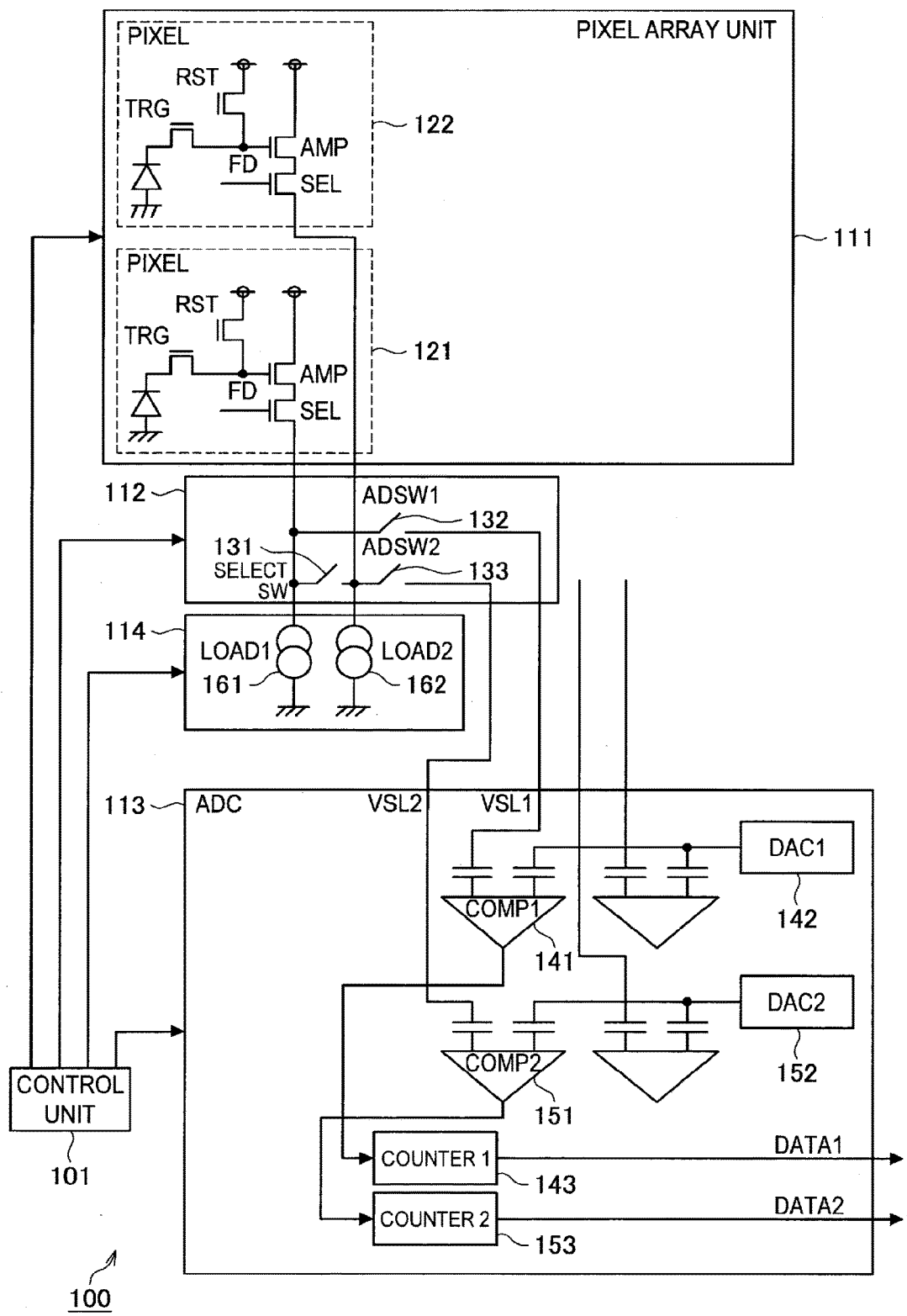

[Fig. 9]
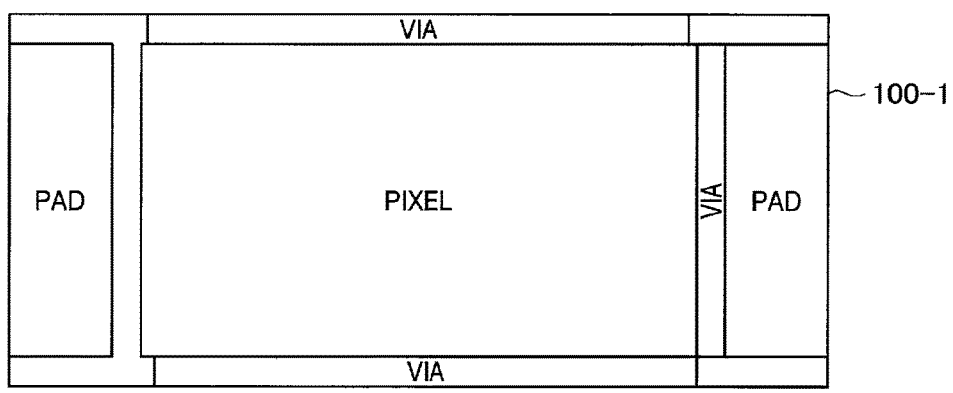
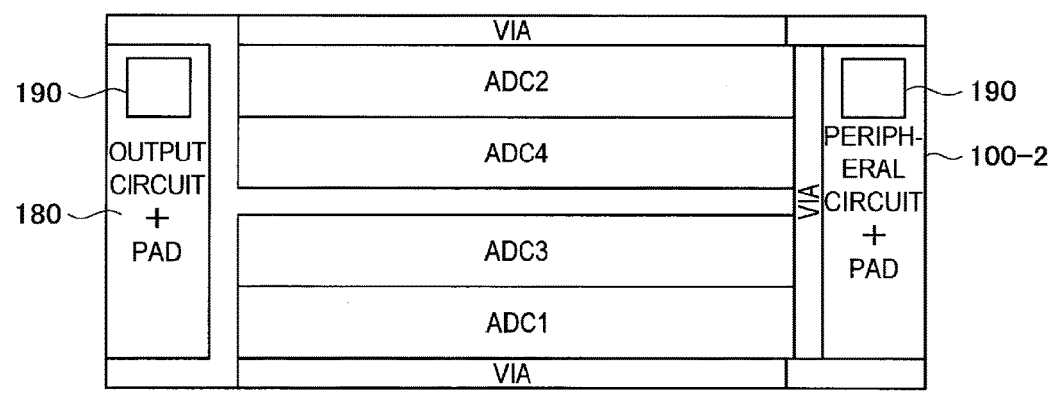

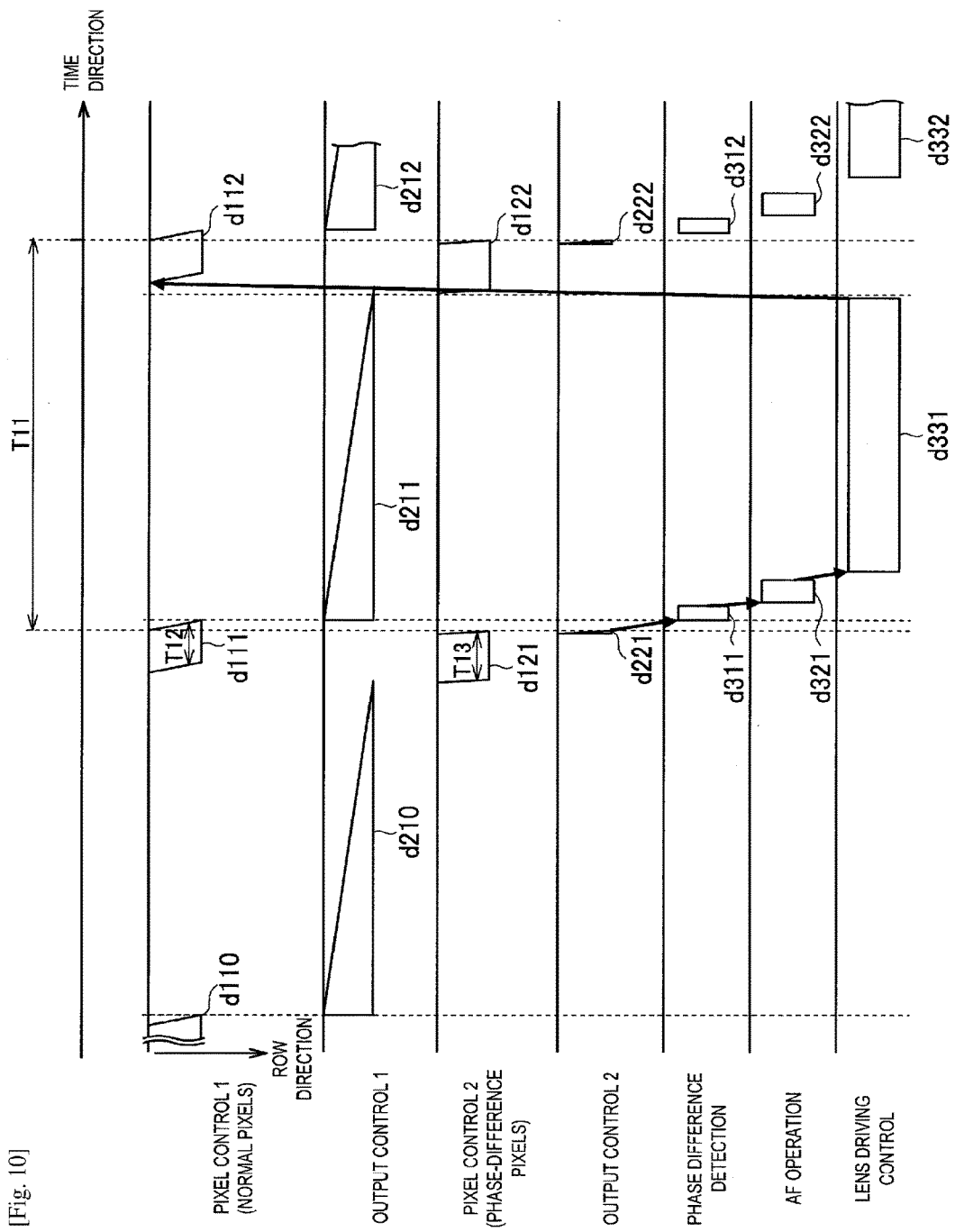
[Fig. 10]

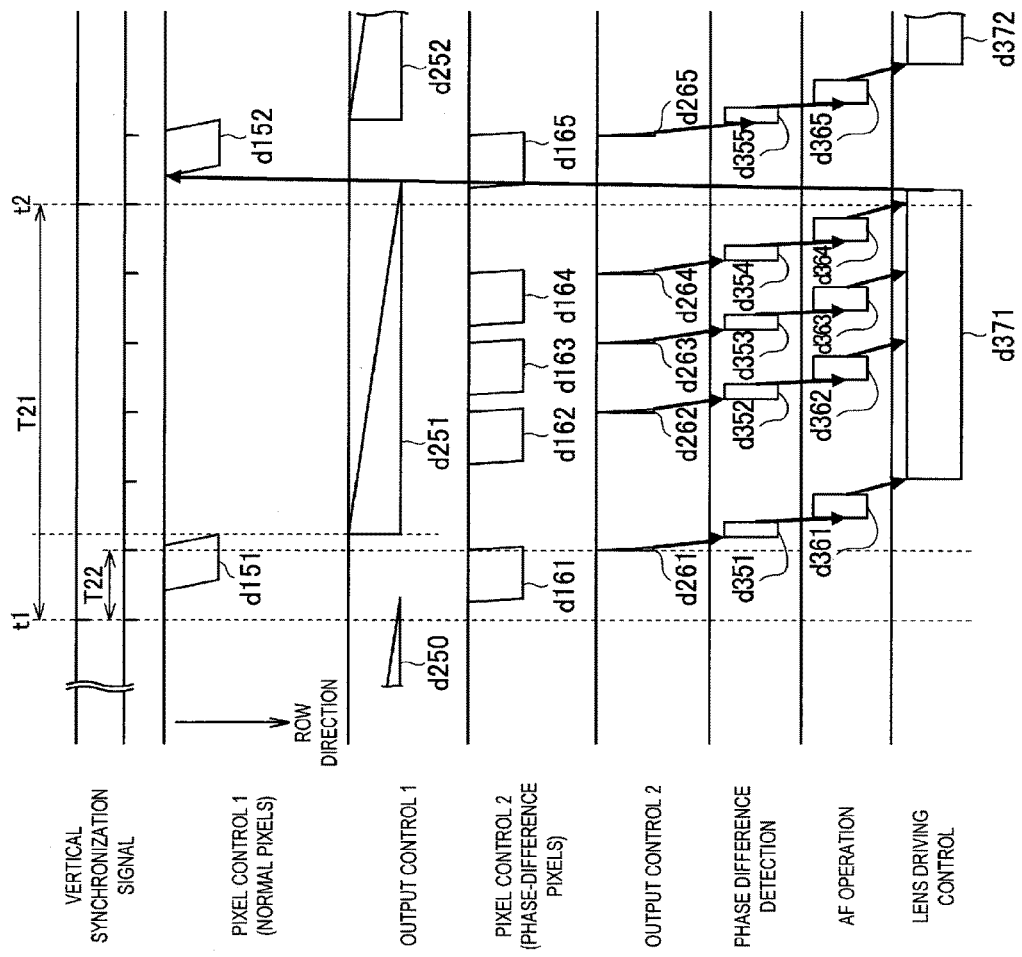
[Fig. 11]

IMAGING CONTROL DEVICE, IMAGING DEVICE, AND IMAGING CONTROL METHOD

CROSS REFERENCE TO RELATED APPLICATIONS

This application claims the benefit of Japanese Priority Patent Application JP 2015-116389 filed Jun. 9, 2015, the entire contents of which are incorporated herein by reference.

TECHNICAL FIELD

The present disclosure relates to an imaging control device, an image device, and an imaging control method.

BACKGROUND ART

Recently, digital still cameras and digital video cameras equipped with image sensors such as charge-coupled device (CCD) and complementary metal-oxide-semiconductor (CMOS) sensors have become prevalent. A digital still camera captures still images while a digital video camera captures moving images, but there also exist digital still cameras capable of capturing moving images and digital video cameras capable of capturing still images. Note that in the following, digital still cameras and digital video cameras may simply be designated a "digital camera" when not being particularly distinguished. Also, in the following, still images and moving images may simply be designated an "image" when not being particularly distinguished.

In many cases, a digital camera as above includes a function of an autofocus process that performs focusing automatically, as disclosed in Patent Literature 1. In an autofocus process, the distance between the digital camera and the subject is measured, and the lens is driven on the basis of the measured distance to suitably adjust the focus, for example. As a result, acquiring an in-focus (focused) image becomes possible.

CITATION LIST

Patent Literature

PTL 1: JP 2013-223054A

SUMMARY

Technical Problem

In the above autofocus process, it is desirable to decrease the time taken (latency) from the measurement of the distance until the result is reflected (for example, the completion of lens driving).

Accordingly, the present disclosure proposes a new and improved imaging control device, imaging device, and imaging control method capable of decreasing the latency of autofocus.

Solution to Problem

According to an embodiment of the present disclosure, there is provided an imaging control device including: a control unit configured to control pixels in a manner that a readout of a focus pixel signal from a focus detection pixel used for focusing and a readout of a main pixel signal from a pixel used for image generation are conducted independently; and an output unit configured to output the focus pixel signal and the main pixel signal independently from each other.

According to an embodiment of the present disclosure, there is provided an imaging device including: a control unit configured to control pixels in a manner that a readout of a focus pixel signal from a focus detection pixel used for focusing and a readout of a main pixel signal from a pixel used for image generation are conducted independently; an output unit configured to output the focus pixel signal and the main pixel signal independently from each other; an input unit configured to accept, as input, the output focus pixel signal and the output main pixel signal independently from each other; and a lens driving instruction unit configured to issue a lens driving instruction based on the focus pixel signal, in a manner that lens driving is conducted during the input of the main pixel signal.

According to an embodiment of the present disclosure, there is provided an imaging control method including: controlling pixels in a manner that a readout of a focus pixel signal from a focus detection pixel used for focusing and a readout of a main pixel signal from a pixel used for image generation are conducted independently; and outputting the focus pixel signal and the main pixel signal independently from each other.

Advantageous Effects of Invention

According to the embodiments of the present disclosure as described above, it is possible to decrease the latency of autofocus.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram illustrating a usage scenario of an imaging device according to an embodiment of the present disclosure.

FIG. 2 is an explanatory diagram for describing an example of a schematic configuration of an imaging device according to a comparative example of the embodiment.

FIG. 3 is an explanatory diagram for describing a flow of an autofocus process during continuous shooting using an imaging device according to a comparative example of the embodiment.

FIG. 4 is an explanatory diagram for describing an overview of an imaging device according to the embodiment.

FIG. 5 is an explanatory diagram illustrating an example of the configuration of an imaging device according to the embodiment.

FIG. 6 is an explanatory diagram for describing an example of the pixel arrangement of a pixel array unit provided in an image sensor according to the embodiment.

FIG. 7 is an explanatory diagram illustrating an example of phase-difference pixels according to the embodiment.

FIG. 8 is a block diagram illustrating an example configuration of part of an image sensor according to the embodiment.

FIG. 9 is an explanatory diagram for describing an example of the configuration of the chip of an image sensor according to the embodiment.

FIG. 10 is a schematic time chart for explaining an operational example 1 according to the embodiment.

FIG. 11 is a schematic time chart for explaining an operational example 2 according to the embodiment.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.

<<1. Introduction>>
<1-1. Background>
<1-2. Overview>
<<2. Configuration>>
<2-1. Configuration of imaging device>
<2-2. Configuration of image sensor>
<<3. Operational examples>>
<3-1. Operational example 1>
<3-2. Operational example 2>
<<4. Modifications>>
<4-1. Modification 1>
<4-2. Modification 2>
<<5. Conclusion>>

1. INTRODUCTION

<1-1. Background>

To describe an imaging device according to an embodiment of the present disclosure, the background that led to the creation of an imaging device according to an embodiment of the present disclosure will be described with reference to the drawings.

FIG. 1 is an explanatory diagram illustrating a usage scenario of an imaging device 1 according to an embodiment of the present disclosure. The imaging device 1 illustrated in FIG. 1 is a digital camera, for example. As illustrated in FIG. 1, the imaging device 1 is equipped with a focus lens 11 used for focusing. Focusing is performed automatically (also referred to as autofocus or AF) by driving and controlling the focus lens 11 according to the distance between the subject and the imaging device 1.

At this point, an autofocus process in an example of an imaging device of the related art will be described as a comparative example with reference to FIGS. 2 and 3. FIG. 2 is an explanatory diagram for describing an example of a schematic configuration of an imaging device according to the comparative example.

The image sensor 800 illustrated in FIG. 2 is provided in the imaging device according to the comparative example, and is an image sensor that images a subject and obtains digital data of a captured image. The image sensor 800 may also be an image sensor such as a complementary metal-oxide-semiconductor (CMOS) image sensor or a charge-coupled device (CCD) image sensor, for example. The image sensor 800 includes a pixel array unit 811 in which multiple pixels are arranged in an array. Note that the image sensor 800 generally includes circuits other than the pixel array unit 811, but in the example illustrated in FIG. 2, circuits other than the pixel array unit 811 are omitted from illustration for the sake of clarity.

In addition, the image processing integrated circuit (IC) 900 is an integrated circuit that performs prescribed image processing on a pixel signal (image signal) supplied on the basis of pixel signals from each pixel of the pixel array unit 811. The image processing may include processing such as black level correction, color mixing correction, defect correction, a demosaicing process, a matrix process, gamma correction, and YC conversion, for example. The image processing unit 910 schematically illustrates the image processing functions realized by the image processing 900. Note that the image processing IC 900 may also include a configuration for executing functions other than image processing, but in the example illustrated in FIG. 2, the configuration other than the image processing unit 910 is omitted from illustration for the sake of clarity.

In addition, the reference sign n0 schematically denotes the flow (stream) of signals between the image sensor 800 and the image processing IC 900.

In other words, in the imaging device according to the comparative example illustrated in FIG. 2, the image sensor 800 opto-electronically converts light incident through an optical element (not illustrated) and A/D converts the pixel value of each pixel to thereby generate a pixel signal indicating a captured image of the subject. Subsequently, the image sensor 800 outputs the generated pixel signal to the image processing unit 910 of the image processing IC 900 as the stream n0.

The image processing IC 900 acquires the pixel signal output from the image sensor 800 as the stream n0, and performs image processing on the acquired pixel signal to measure the distance between the subject and the imaging device (subject distance). The imaging device according to the comparative example performs focusing (autofocus) by driving and controlling the focus lens provided in the imaging device on the basis of the measured subject distance. For example, the imaging device according to the comparative example may execute autofocus according to an image surface phase difference technique. In other words, the pixel array unit 811 according to the comparative example includes phase-difference pixels for focusing according to the phase difference technique, the image processing unit 910 measures the subject distance on the basis of pixel signals from the phase-difference pixels (focus pixel signals), and the focus lens is driven and controlled on the basis of the subject distance.

Next, FIG. 3 will be referenced to describe an example of the flow of a process in the imaging device illustrated in FIG. 2, in which an image of a subject is exposed (imaged) by the image sensor 800, a pixel signal expressing the exposed image is read out to the image processing IC 900, and the lens driving control is completed. FIG. 3 is an explanatory diagram for describing the flow of an autofocus process during continuous shooting using the imaging device according to the comparative example, and illustrates an example of a schematic time chart for the case in which the imaging device according to the comparative example electronically controls the exposure time of each pixel.

In FIG. 3, the horizontal axis represents the time direction, while the vertical axis of the pixel and output control represents the row direction of the pixel array unit 811. Additionally, the reference signs d910, d911, d912, and d913 schematically denote exposure periods of respective pixels of the pixel array unit 811. Note that the exposure period d910 is taken to represent the exposure period of an image captured before the exposure period d911.

At this point, the flow of the series of processes when autofocus is executed in the imaging device according to the comparative example will be described by paying attention to the exposure period d911. First, as indicated by the reference sign d901, a reset of the pixel signals accumulated in each pixel is sequentially executed in units of rows, and after the reset of each pixel is complete, light is incident on the pixels, and the exposure of the pixels is started immediately. After that, as indicated by the reference sign d921, after the exposure of each pixel ends, the readout of pixel signals from the pixels and the output to the image processing unit 910 is started immediately. In other words, for each pixel, the period T92 between the reference signs d901 and d921 corresponds to the exposure time for the relevant pixel, and the period T93 from the start to the end of the reference sign d921 corresponds to the time taken for the readout and output of all pixels. As above, in the example illustrated in FIG. 3, the timing of the start and end of the exposure of each pixel and the timing of the readout and output of each pixel are different per row.

After pixel signals are output to the image processing unit 910 from all pixels, during the period indicated by the reference sign d951 in FIG. 3, the image processing unit 910 performs phase-difference detection on the basis of focus pixel signals corresponding to the phase-difference pixels, and thereby measures the subject distance (rangefinding). Subsequently, during the period indicated by the reference sign d961 in FIG. 3, an AF operation of computing the lens driving amount on the basis of the measured subject distance and the lens position during the exposure period d911 is performed. Furthermore, during the period indicated by the reference sign d971 in FIG. 3, driving control of a focus lens provided in the imaging device according to the comparative example is performed. As a result, the image from the exposure period d913 illustrated in FIG. 3 reflects the autofocus executed on the basis of the image from the exposure period d911 illustrated in FIG. 3. In other words, in the example of FIG. 3, the time taken (latency) from the start of exposure for rangefinding until the autofocus is reflected is twice the time of the shooting interval T91.

As illustrated in FIG. 1, in the case of using an imaging device to shoot a moving subject in a sports scene or the like, the latency of autofocus becomes important. For example, if the subject moves, or if the distance between the subject and the imaging device changes between the exposure for rangefinding and the completion of driving control of the focus lens, an out-of-focus image may be acquired in some cases. Consequently, a small latency of autofocus is desirable.

Accordingly, focusing on the above circumstances led to the creation of the present embodiment. According to the present embodiment, it is possible to decrease the latency of autofocus. Hereinafter, an overview of an imaging device according to the present embodiment having such advantageous effects will be described.

<1-2. Overview>

FIG. 4 is an explanatory diagram for describing an overview of an imaging device according to an embodiment of the present disclosure. Note that FIG. 4 primarily illustrates an image sensor 100 and an image processing IC 200 as a schematic configuration of the imaging device 1 (imaging control device) according to the present embodiment, whereas other parts of the configuration are omitted from illustration.

As illustrated in FIG. 4, the image sensor 100 according to the present embodiment differs from the image sensor 800 according to the comparative example illustrated in FIG. 2 by including frame memory 190. The reference signs n1 and n2 schematically denote the flow (stream) of signals between the image sensor 100 and the image processing IC 200.

In addition, the imaging device 1 according to the present embodiment executes autofocus according to an image surface phase difference technique, and electronically controls the exposure period of each pixel, similarly to the comparative example described with reference to FIGS. 2 and 3. In other words, a pixel array unit 111 included in the image sensor 100 according to the present embodiment illustrated in FIG. 4 includes phase-difference pixels (focus detection pixels) for performing focusing according to a phase difference technique, and normal pixels used for image generation, and the exposure period of each pixel is controlled electronically.

In an imaging device according to the present embodiment illustrated in FIG. 4, the image sensor 100 optoelectronically converts light incident through an optical element (not illustrated) and A/D converts the pixel value of each pixel to thereby generate an image signal expressing a captured image of the subject (also referred to as readout). At this point, the image sensor 100 reads out a focus image signal from at least the phase difference pixels among the multiple pixels constituting the pixel array unit 111, and outputs the focus image signal to the image processing IC 200 as a stream n1.

In addition, the image sensor 100 reads out a main pixel signal from at least the normal pixels among the multiple pixels constituting the pixel array unit 111, and temporarily records the main pixel signal in the frame memory 190. Subsequently, the image sensor 100 outputs the main pixel signal recorded in the frame memory 190 to the image processing IC 200 as a stream n2.

According to such a configuration, the image sensor 100 is able to output mutually independent pixel signals to the image processing IC 200, outputting a focus image signal from the phase difference pixels as the stream n1 and outputting a main pixel signal (image) from the normal pixels as the stream n2, for example. Note that although the above describes an example of outputting a focus image signal from the phase difference pixels as the stream n1, the present technology is not limited to such an example. For example, it is also possible to output a pixel signal read out from some of the normal pixels used for image generation as the stream n1. Such an example will be described later as a modification.

Note that the since the image sensor 100 is able to temporarily hold pixel signals from all pixels in the frame memory 190, for example, it is not strictly necessary to output the stream n1 and the stream n2 to the image processing IC 200 in parallel at the same timing. In other words, the image sensor 100 may also output the stream n2 after outputting the stream n1. Obviously, the image sensor 100 may also output the stream n1 and the stream n2 to the image processing IC 200 in parallel.

For this reason, for example, the image processing IC 200 is able to perform a phase difference detection process on the basis of the focus pixel signal (stream n1) output from the image sensor 100 prior to the main pixel signal (stream n2). According to such a configuration, the imaging device 1 according to the present embodiment is able to decrease the latency of autofocus.

Also, as another example, the image processing IC 200 is capable of executing the acquisition of the main pixel signal output as the stream n2 in parallel with the phase difference detection process based on the focus pixel signal output from the image sensor 100 in advance as the stream n1.

Note that the image sensor 100 and the image processing IC 200 do not have to be provided inside the same housing. In such cases, the device provided with the image sensor 100 corresponds to an example of an "imaging control device".

The above thus describes an overview of an imaging device 1 according to the present embodiment. Next, in the following, the configuration and operation of the imaging device 1 according to the present embodiment will be described successively in further detail.

2. CONFIGURATION

In the following, first, an example configuration of the imaging device 1 according to the present embodiment will be described with reference to FIG. 5, and then an example configuration of the image sensor 100 provided in the imaging device 1 will be described with reference to FIGS. 6 to 9.

<2-1. Configuration of Imaging Device>

FIG. 5 is an explanatory diagram illustrating an example of the configuration of the imaging device 1 according to the present embodiment, and illustrates an example of the case in which the image sensor 100 and the image processing IC 200 discussed above are provided inside the same housing. The imaging device 1 illustrated in FIG. 5 is a device that images a subject, and outputs an image of the subject as an electric signal.

As illustrated in FIG. 5, the imaging device 1 includes a focus lens 11 (hereinafter also simply called the lens in some cases), the image sensor 100, a driving control unit 12, an operating unit 13, an image processing unit 210, a codec processing unit 14, a recording unit 15, and a display unit 16.

The focus lens 11 is controlled by the driving control unit 12, and adjusts the focus on the subject, condenses light from the in-focus position, and supplies the condensed light to the image sensor 100.

The image sensor 100 is an image sensor that images the subject, is controlled by the driving control unit 12, and reads out and outputs pixel signals by opto-electronically converting incident light and A/D converting the pixel value of each pixel. Herein, as discussed earlier, the image sensor 100 independently performs readout of focus pixel signals from phase-difference pixels (focus detection pixels) used for focusing, and readout of main pixel signals from normal pixels used for image generation. In addition, the image sensor 100 independently outputs the focus pixel signal and the main pixel signal to the image processing unit 210.

The driving control unit 12, on the basis of a signal corresponding to the operating input of a user input by the operating unit 13, controls the driving of the focus lens 11, the image sensor 100, the image processing unit 210, the codec processing unit 14, the recording unit 15, and the display unit 16, and causes each component to conduct processes related to imaging. In particular, the driving control unit 12 includes a function of acting as a lens driving instruction unit that issues lens driving instructions based on a focus pixel signal input prior to a main pixel signal, so that lens driving is conducted during the input of the main pixel signal from the image sensor 100 to the image processing unit 210. For example, the driving control unit 12 receives a result of phase difference detection conducted by the image processing unit 210 on the basis of the focus pixel signal, computes a lens driving amount according to an AF operation, and issues lens driving instructions. Note that the image processing unit 210 may also act as the lens driving instruction unit and issue lens driving instructions.

The operating unit 13 is made up of components such as a jog dial (trademarked), keys, buttons, or a touch panel, for example, receives operating input by a user, and supplies a signal corresponding to the operating input to the driving control unit 12.

The image processing unit 210 receives pixel signals from the image sensor 100 and conducts image processing. For example, the image processing unit 210 includes a function of acting as an input unit that independently accepts the input of a focus pixel signal and a main pixel signal output from the image sensor 100. In addition, the image processing unit 210 conducts phase difference detection on the basis of the focus pixel signal, and provides the result of phase difference detection to the driving control unit 12. The image processing unit 210 also performs various image processing, such as black level correction, color mixing correction, defect correction, a demosaicing process, a matrix process, gamma correction, and YC conversion, for example. The content of the image processing is arbitrary, and processes other than above may also be conducted. Additionally, the image processing unit 210 supplies the processed image signal to the codec processing unit 14 and the display unit 16.

The codec processing unit 14 performs a coding process of a designated scheme on an image signal from the image processing unit 210, and supplies image data obtained as a result of the coding process to the recording unit 15.

The recording unit 15 records image data supplied from the codec processing unit 14. The image data recorded on the recording unit 15, is read out by the image processing unit 210 as appropriate, thereby supplied to the display unit 16, and a corresponding image is displayed.

The display unit 16 is configured as a liquid crystal display, for example, and displays an image of the subject on the basis of an image signal from the image processing unit 210.

<2-2. Configuration of Image Sensor>

The above thus describes an example configuration of the imaging device 1 according to the present embodiment with reference to FIG. 5. Next, an example configuration of the image sensor 100 provided in the imaging device 1 will be described with reference to FIGS. 6 to 9.

(Pixel Arrangement)

First, FIG. 6 will be referenced to describe an example of the pixel arrangement of the pixel array unit 111 provided in the image sensor 100 according to the present embodiment described with reference to FIG. 4, while paying particular attention to the arrangement of the phase-difference pixels included in the pixel array unit 111. FIG. 6 is an explanatory diagram for describing an example of the pixel arrangement of the pixel array unit 111 provided in the image sensor 100 according to the present embodiment. In the pixel array unit 111, besides red, blue, and green normal pixels, phase-difference pixels 121a and 121b used for focusing are periodically arranged at the positions labeled A and B in FIG. 6.

FIG. 7 is an explanatory diagram illustrating an example of phase-difference pixels according to the present embodiment. The phase-difference pixels 121a and 121b arranged in the pixel array unit 111 may be a left-opening pixel 121a and a right-opening pixel 121b as illustrated in the top row of FIG. 7, for example. As illustrated in FIG. 7, in the left-opening pixel 121a and the right-opening pixel 121b, on-chip lenses 1211a and 1211b are covered by oblique metal 1212a and 1212b. In addition, a left-opening part 1213a is provided on the left side of the oblique metal 1212a included in the left-opening pixel 121a. The left-opening pixel 121a is capable of receiving only light incident on the area of the left-opening part 1213a. Similarly, a right-opening part 1213b is provided on the right side of the oblique metal 1212b included in the right-opening pixel 121b. The right-opening pixel 121b is capable of receiving only light incident on the area of the right-opening part 1213b. Consequently, light flux traveling along different optical paths of the shooting lens is sensed by the left-opening pixel 121a and the right-opening pixel 121b, respectively.

By treating the left-opening pixel 121a and the right-opening pixel 121b above as a pair of pixels, and having the image processing unit 210 evaluate the degree of shift between two images in focus pixel signals corresponding to the pair of pixels, a phase difference detection process is conducted.

Note that although the above describes an example in which the phase-difference pixels arranged in the pixel array unit 111 are pairs of pixels including a left-opening pixel and a right-opening pixel, the present technology is not limited to such an example. For example, as illustrated in the middle row of FIG. 7, the phase-difference pixels arranged in the pixel array unit 111 may also be pairs of pixels including a top-opening pixel 121c and a bottom-opening pixel 121d. The top-opening pixel 121c and the bottom-opening pixel 121d are equipped with on-chip lenses 1211c and 1211d, oblique metal 1212c and 1212d, and a top-opening part 1213c and a bottom-opening part 1213d, respectively, similarly to the left-opening pixel 121a and the right-opening pixel 121b above.

In addition, the phase-difference pixels arranged in the pixel array unit 111 may also be segmented photodiode pixels. In this case, for example, one type of either the left/right segmented photodiode pixel 121e illustrated in the bottom-left of FIG. 7 or the top/bottom segmented photodiode pixel 121f illustrated in the bottom-right of FIG. 7 may be arranged as the phase-difference pixels. In the left/right segmented photodiode pixel 121e, a single on-chip lens 1211e is provided with two photodiodes (left photodiode 1214a and right photodiode 1214b) capable of sensing light independently. Similarly, in the top/bottom segmented photodiode pixel 121f, a single on-chip lens 1211f is provided with two photodiodes (top photodiode 1214c and bottom photodiode 1214d) capable of sensing light independently. By evaluating the degree of shift between two images in focus pixel signals corresponding to one of the above segmented photodiode pixels, the image processing unit 210 is able to conduct a phase difference detection process.

(Configuration Related to Readout and Output)

The above thus describes an example of the pixel arrangement of the pixel array unit 111 provided in the image sensor 100 according to the present embodiment. Next, FIG. 8 will be referenced to describe an example of the configuration related to readout and output in the image sensor 100, while paying particular attention to the configuration that opto-electronically converts light incident via an optical element (not illustrated) and A/D converts the pixel value of each pixel to thereby read out a pixel signal.

FIG. 8 is a block diagram illustrating an example configuration of part of the image sensor 100 according to the present embodiment. The image sensor 100 illustrated in FIG. 8 is an image sensor that images a subject and obtains digital data of a captured image, and may be a complementary metal-oxide-semiconductor (CMOS) image sensor or a charge-coupled device (CCD) image sensor, for example.

As illustrated in FIG. 8, the image sensor 100 includes a control unit (or control circuitry) 101, the pixel array unit 111, a selection unit 112, an analog-to-digital converter (ADC) 113, and a constant-current circuit unit 114.

The control unit 101 controls each component of the image sensor 100, and causes processes related to the readout of image data (pixel signals) and the like to be executed. In particular, the control unit 101 according to the present embodiment controls pixels so that the readout of focus pixel signals from phase-difference pixels (focus detection pixels) used for focusing and the readout of main pixel signals from normal pixels used for image generation are conducted independently.

Note that conducting the readout of focus pixel signals and the readout of main pixel signals independently means that the readout of focus pixel signals and the readout of main pixel signals are conducted without restricting each other. For example, the above includes cases such as the case in which the readout of focus pixel signals and the readout of main pixel signals are conducted in different periods, the case in which the readout periods overlap but the start timings for the readout of the respective pixel signals are different, and the case in which the respective pixel signals are read out in parallel.

In addition, the control unit 101 according to the present embodiment includes a function of acting as an exposure control unit that respectively controls the exposure of the focus detection pixels and the exposure of the pixels used for image generation. For example, the control unit 101 may exhibit the function of acting as an exposure control unit, and control the exposure of the phase-difference pixels and the exposure of the normal pixels so that the exposure time of the phase-difference pixels (focus detection pixels) is different from the exposure time of the normal pixels. For example, the control unit 101 may control the exposure of the phase-difference pixels and the exposure of the normal pixels so that the exposure time of the phase-difference pixels is longer than the exposure time of the normal pixels. According to such a configuration, even if the phase-difference pixels have a narrower light-sensing area than the normal pixels, it becomes possible to receive more light, resulting in an advantageous effect of improving AF accuracy in dark areas, for example. The control unit 101 may also control the exposure of the phase-difference pixels and the exposure of the normal pixels so that the exposure time of the phase-difference pixels is shorter than the exposure time of the normal pixels. According to such a configuration, when conducting AF on a bright subject, there is an advantageous effect of reducing the effects of pixel value overflow on AF accuracy.

As described with reference to FIGS. 6 and 7, the pixel array unit 111 is a pixel area in which pixel structures, including photoelectric transducers such as photodiodes, are arranged in an array. The pixel array unit 111, under control by the control unit 101, senses the light from a subject with each pixel, opto-electronically converts the incident light to accumulate electric charge, and at designated timings, outputs the electric charge accumulated in each pixel as an analog pixel signal.

The pixel 121 and the pixel 122 represent two pixels neighboring each other top-to-bottom from among the pixel group arranged in the pixel array unit 111. The pixel 121 and the pixel 122 are pixels lying in the same column on consecutive rows. For example, the pixel 121 may be a phase-difference pixel used for focusing as described with reference to FIGS. 6 and 7, while the pixel 122 may be a normal pixel used for image generation. In the case of the example in FIG. 8, as illustrate in the pixel 121 and the pixel 121, a photoelectric transducer and four transistors are used in the circuit of each pixel. Note that the configuration of the circuit of each pixel is arbitrary, and may be different from the example illustrated in FIG. 8.

In a typical pixel array, an output line for an analog pixel signal is provided every column. In the case of the pixel array unit 111, two output lines (two systems) are provided for every one column. The pixel circuits in one column are alternately connected to these two output lines, alternating every row. For example, the pixel circuits on the odd-numbered rows counting from the top are connected to one output line, and the pixel circuits on the even-numbered rows are connected to the other output line. In the case of the example in FIG. 8, the circuit of the pixel 121 is connected to a first output line (VSL1), while the circuit of the pixel 122 is connected to a second output line (VSL2).

Note that in FIG. 8, only the output lines for one column are illustrated for the sake of convenience, but in actual practice, two output lines are provided similarly for each column, respectively, and the pixel circuits in each column are alternately connected to the output lines, alternating every row.

The selection unit 112 includes switches that connect each output line of the pixel array unit 111 to the input of the ADC 113, and under control by the control unit 101, controls connections between the pixel array unit 111 and the ADC 113. In other words, analog pixel signals read out from the pixel array unit 111 are supplied to the ADC 113 through the selection unit 112.

The selection unit 112 includes a switch 131, a switch 132, and a switch 133. The switch 131 (Select SW) controls the connection of two output lines corresponding to the same column to each other. For example, if the switch 131 turns on, the first output line (VSL1) and the second output line (VSL2) are connected, whereas if the switch 131 turns off, the connection is broken.

Although discussed later in detail, in the image sensor 100, one ADC is provided for each output line (column ADC). Consequently, supposing that the switch 132 and the switch 133 are both turned on, if the switch 131 turns on, the two output lines in the same column are connected, and thus two ADCs become connected to the circuit of one pixel. Conversely, if the switch 131 turns off, the two output lines in the same column are disconnected, and one ADC becomes connected to the circuit of one pixel. In other words, the switch 131 selects the number of ADCs (column ADCs) to act as the output destination for a signal from one pixel.

Although discussed later in detail, by having the switch 131 control the number of ADCs to act as the output destination for analog pixel signals, the image sensor 100 is able to output more diverse pixel signals to the image processing IC 200 according to the number of ADCs. In other words, the image sensor 100 is able to realize more diverse data output.

The switch 132 controls the connection between the first output line (VSL1) corresponding to the pixel 121 and the ADC corresponding to that output line. If the switch 132 turns on, the first output line is connected to the input of one of the comparators in the corresponding ADC, whereas if the switch 132 turns off, the connection is broken.

The switch 133 controls the connection between the second output line (VSL2) corresponding to the pixel 122 and the ADC corresponding to that output line. If the switch 133 turns on, the second output line is connected to the input of one of the comparators in the corresponding ADC, whereas if the switch 132 turns off, the connection is broken.

The selection unit 112, under control by the control unit 101, switches the states of these switches 131 to 133, and is thereby able to control the number of ADCs (column ADCs) to act as the output destination for a signal from one pixel.

Note that the switch 132 and the switch 133 (one of either, or both) may also be omitted, and each output line and the ADC corresponding to that output line may be continuously connected. However, these switches enable control of connection and disconnection, thereby broadening the range of selection of the number of ADCs (column ADCs) to act as the output destination for a signal from one pixel. In other words, by providing these switches, the image sensor 100 is able to output more diverse pixel signals.

Note that in FIG. 8, only the output lines for one column are illustrated, but in actual practice, the selection unit 112 includes a configuration similar to that illustrated in FIG. 8 (the switches 131 to 133) for each column. In other words, the selection unit 112, under control by the control unit 101, performs a connection control similar to the above-described for each column.

The ADC 113 respectively A/D converts analog pixel signals supplied via each output line from the pixel array unit 111, and outputs a pixel signal (digital data). The ADC 113 includes an ADC (column ADC) for each output line from the pixel array unit 111. In other words, the ADC 113 includes multiple column ADCs. The column ADC corresponding to one output line is a single-slope ADC including a comparator, a digital-to-analog converter (DAC), and a counter.

The comparator compares the DAC output to the signal value of an analog pixel signal. The counter increments a count value (digital value) until the analog pixel signal and the DAC output become equal. The comparator stops the counter when the DAC output reaches the signal value. After that, signals digitized by Counters 1 and 2 are output outside the image sensor 100 from DATA1 and DATA2.

After outputting data, the counter reverts the count value to an initial value (for example, 0) for the next A/D conversion.

The ADC 113 includes two systems of column ADCs for each column. For example, a comparator 141 (COMP1), a DAC 142 (DAC1), and a counter 143 (Counter 1) are provided for the first output line (VSL1), and a comparator 151 (COMP2), a DAC 152 (DAC2), and a counter 153 (Counter 2) are provided for the second output line (VSL2). Although omitted from illustration, the ADC 113 includes a similar configuration for the output lines of other columns.

However, the DAC may be shared in common among these configurations. Sharing of the DAC is conducted per system. In other words, the DAC is shared among the columns belonging to the same system. In the case of the example in FIG. 8, the DAC corresponding to the first output line (VSL1) of each column is shared as the DAC 142, and the DAC corresponding to the second output line (VSL2) of each column is shared as the DAC 152. Note that the comparator and the counter are provided for each system of output line.

The constant-current circuit unit 114 is a constant-current circuit connected to each output line, and is driven by being controlled by the control unit 101. The circuit of the constant-current circuit unit 114 is made up of a component such as a metal-oxide semiconductor (MOS), for example. The circuit configuration is arbitrary, but in FIG. 8, for the sake of convenience, a MOS transistor 161 (LOAD1) is provided for the first output line (VSL1), and a MOS transistor 162 (LOAD2) is provided for the second output line (VSL2).

The control unit 101 receives an external request, such as from a user, for example, selects a readout mode, and controls the selection unit 112 to control connections to the output lines. In addition, the control unit 101 may also control the driving of the column ADCs, depending on the selected readout mode. Furthermore, besides the column ADCs, the control unit 101 may also control the driving of the constant-current circuit unit 114 or control the driving of the pixel array unit 111, such as the readout rate and timings, for example, as appropriate.

In other words, the control unit 101 is able to control not only the selection unit 112 but also components other than the selection unit 112, and cause the components to operate in more diverse modes. Consequently, the image sensor 100 is able to output more diverse pixel signals.

Note that the number of each component illustrated in FIG. 8 is arbitrary insofar as the number is not insufficient. For example, three or more systems of output lines may also be provided for each column. Additionally, the number of pixel signals output externally in parallel may be increased by increasing the number of parallel pixel signals output from the ADC 113, or by increasing the number of the ADC 113 itself.

Next, FIG. 9 will be referenced to describe a configuration of the chip of the image sensor 100 according to the present embodiment. FIG. 9 is an explanatory diagram for describing an example of the configuration of a chip of the image sensor 100 according to the present embodiment. As described with reference to FIG. 8, if multiple ADCs are provided for each column, the chip size increases, and costs may increase in some cases. For this reason, in the image sensor 100 according to the present embodiment, the chip is layered as illustrated in FIG. 9.

In the example illustrated in FIG. 9, the image sensor 100 is made up of multiple chips: a pixel chip 100-1 on which the pixel array unit 111 is formed primarily, a peripheral circuit chip 100-2 on which components such as an output circuit 180, peripheral circuits, and the ADC 113 are formed, and pads (PAD). The output lines and drive lines of the pixel array unit 111 of the pixel chip 100-1 are connected to the circuits of the peripheral circuit chip 100-2 through vias (VIA). Note that the frame memory 190 illustrated in FIG. 4 may be provided inside the output circuit 180 or a peripheral circuit, for example. The output circuit 180 functions as an output unit that independently outputs a focus pixel signal and a main pixel signal read out as described above.

By taking a configuration like the above, the chip size may be reduced, and the cost may be decreased. Also, since extra space is available for interconnect layers, the laying out of interconnections also becomes easy. Furthermore, by dividing the configuration into multiple chips, each chip may be optimized respectively. For example, in the pixel chip, a lower profile may be realized by using fewer interconnect layers to avoid lowered quantization efficiency due to optical reflections because of the interconnect layers. Meanwhile, in the peripheral circuit chip, greater stratification of the interconnect layers may be realized to enable optimizations such as countermeasures against interconnect coupling. For example, the interconnect layers in the peripheral circuit chip may be more greatly stratified than the interconnect layers in the pixel chip.

Note that in the case of a back-illuminated image sensor, optical reflections due to the interconnect layers do not occur, but by minimizing increases in an unwanted number of interconnect layers, increases in the number of interconnection processing steps and other issues may be minimized, and cost savings may be realized.

In addition, since the peripheral circuit chip area has a chip surface area similar to the pixel chip area, it is possible to mount multiple ADCs in the peripheral circuit area without increasing the surface area of the total stacked chip.

Note that an imaging control device (imaging device) to which an embodiment of the present technology is applied is not limited to the configuration discussed above, and obviously may be configured in other ways.

As above, the image sensor 100 according to the present embodiment opto-electronically converts light incident through an optical element (not illustrated) and A/D converts the pixel value of each pixel to generate pixel signals, and reads out each generated pixel signal from DATA1 and DATA2 illustrated in FIG. 8. Subsequently, the output circuit 180 outputs a focus pixel signal output from one of DATA1 and DATA2 (taken to be DATA1 herein), to the image processing IC 200 as the stream n1 illustrated in FIG. 4, for example.

In addition, the image sensor 100 temporarily records the main pixel signal read out from DATA2 in the frame memory 190. Subsequently, the image sensor 100 sequentially outputs the main pixel signal recorded in the frame memory 190, and the output circuit 180 outputs the main pixel signal read out from the frame memory 190 to the image processing IC 200 as the stream n2. Note that the primary agent of the control related to the input and output of pixel signals with respect to the frame memory 190 and the output of pixel signals from the output circuit 180 is not particularly limited. For example, the above control may be conducted by the control unit 101 discussed earlier, or a control unit separate from the control unit 101 may be provided. Additionally, the above control may also be conducted according to control from a control unit provided externally to the image sensor 100 (such as the image processing IC 200, for example).

In addition, if it is possible to temporarily hold pixel signals acquired by each pixel constituting the pixel array unit 111, the position at which the frame memory 190 is provided and the number of the frame memory 190 is not particularly limited. For example, by providing a plural number of the frame memory 190, it becomes possible to execute in parallel the input and output of pixel signals with respect to each of the multiple frame memories 190. For this reason, it becomes possible to moderate a lowering of processing speed dependent on the speed related to the input and output of pixel signals with respect to the frame memory 190.

As another example, on the pixel circuit of each pixel constituting the pixel array unit 111, a cache for temporarily holding the pixel signal acquired from the relevant pixel may be provided. According to such a configuration, it becomes possible to more flexibly control the execution timings of processes related to the input and output of pixel signals between each pixel and the frame memory 190, and processes related to the readout of each pixel signal from the frame memory 190. In addition, since the number of pins for writing pixel signals from each pixel circuit to the frame memory 190 increases, it also becomes possible to widen the bandwidth of the bus between the pixel circuits and the frame memory 190.

3. OPERATIONAL EXAMPLES

The above thus describes an example configuration of the imaging device 1, and the image sensor 100 provided in the imaging device 1, according to the present embodiment with reference to FIGS. 5 to 9. Next, as operational examples of the imaging device 1 according to the present embodiment, an example in which the readout and output of a focus pixel signal is conducted one time to perform focusing one time, and an example in which the readout and output of a focus pixel signal is conducted multiple times to perform focusing one time will be successively described hereinafter with reference to FIGS. 10 and 11.

3-1. Operational Example 1

FIG. 10 is a schematic time chart for explaining an operational example 1 in which, in the imaging device 1 according to the present embodiment, the readout and output of a focus pixel signal is conducted one time to perform focusing one time.

FIG. 10 illustrates relationships among a pixel control related to an exposure and readout process for each pixel, an output control related to a process of transmitting pixel signals from the output circuit 180 to the image processing IC 200, phase difference detection related to a focusing process based on pixel signals, an AF operation, and a lens driving control. Note that the pixel control 1 and the output control 1 are the pixel control and the output control related to the normal pixels used for image generation, while the pixel control 2 and the output control 2 are the pixel control and output control related to the focus pixels used for focusing. Also, in FIG. 10, the horizontal axis represents the time direction. Also, the vertical axis in the pixel control 1, the pixel control 2, the output control 1, and the output control 2 represents the position in the row direction of the pixels that are the output source of the target pixel signal.

The period T11 illustrated in FIG. 10 indicates the shooting interval in the image sensor 100 according to the present embodiment. The period T12 indicates the exposure time of the normal pixels according to the present embodiment, and the period T13 indicates the exposure time of the phase-difference pixels according to the present embodiment. In the present embodiment, the period T12 which is the exposure time of the normal pixels and the period T13 which is the exposure time of the phase-difference pixels may be different. For example, the control unit 101 may exhibit the function of acting as an exposure control unit, and control the exposure of the phase-difference pixels and the exposure of the normal pixels so that the period T13 which is the exposure time of the phase-difference pixels (focus detection pixels) is longer than the period T12 which is the exposure time of the normal pixels. According to such a configuration, there is an advantageous effect of improving AF accuracy in dark areas, as discussed earlier.

In addition, the reference signs d210 to d212 denote, in each of the exposure periods d110 to d112, an output process of the output circuit 180 outputting a main pixel signal read out from the normal pixels and recorded in the frame memory 190 by the image sensor 100. In addition, the reference signs d221 and d222 denote, in each of the exposure periods d121 and d122, an output process of the output circuit 180 outputting a focus pixel signal read out from the phase-difference pixels by the image sensor 100. Note that in the output processes d210 to d212, the output circuit 180 outputs the main pixel signal as the stream n2 illustrated in FIG. 4, whereas in the output processes d221 and d222, the output circuit 180 outputs the focus pixel signal as the stream n1 illustrated in FIG. 4.

In addition, the reference signs d311 and d312 denote a phase difference detection process of the image processing unit 210 measuring the subject distance (rangefinding) after being input with focus pixel signals (that is, after receiving the output of the output circuit 180) in the output processes d221 and d222. In addition, the reference signs d321 and d322 denote an AF operation process of the driving control unit 12 computing a lens driving amount on the basis of the subject distance measured in the phase difference detection processes d221 and d222, and the lens position during the exposure periods d121 and d122. In addition, the reference signs d331 and d332 denote a lens driving process starting from the driving control unit 12 issuing lens driving instructions and ending with the completion of lens driving, based on the lens driving amounts computed in the AF operation processes d321 and d322. Note that in the following, the phase difference detection processes, the AF operation processes, and the lens driving processes collectively may be referred to as the series of AF-related processes.

As illustrated in FIG. 10, after the exposure of the normal pixels and the readout of the main pixel signals (recording to the frame memory 190) finishes in the exposure periods d110 to d112, the output processes d210 to d212 of outputting the main pixel signals read out from the frame memory 190 are conducted. Meanwhile, after the exposure of the phase-difference pixels and the readout of the focus pixel signals finishes in the exposure periods d121 and d122, the output processes d221 and d222 of outputting the readout focus pixel signals are conducted.

Herein, in the present embodiment, the number of phase-difference pixels used for focusing is small compared to the number of normal pixels, and in addition, the focus pixel signal is output without going through the frame memory 190. For these reasons, the processing time of the output processes d221 and d222 is short compared to the output processes d210 to d212. Consequently, by conducting the A/D conversion and recording to the frame memory 190 of the normal pixels immediately after the A/D conversion (readout) and output process d221 of the phase-difference pixels, for example, the lens driving process d331 is completed during the input and output of the normal pixels (output process d211). In other words, it is possible to complete the series of AF-related processes d311, d321, and d331 by the start of the exposure period d112 of the normal pixels. Consequently, in this operational example illustrated in FIG. 10, the time taken (latency) from the start of exposure for rangefinding until the autofocus is reflected less than or equal to the total of the shooting interval T11 and the exposure period d121 of the phase-difference pixels. Since the exposure period d121 of the phase-difference pixels is small compared to the shooting interval, the present operational example is able to decrease the latency of autofocus compared to the comparative example described with reference to FIG. 3.

Note that although the example of FIG. 10 illustrates an example of the lens driving process d331 being completed by the start of the exposure period d122 of the phase-difference pixels, the present operational example is not limited to such an example. For example, if the lens driving process d331 is not completed by the start of the exposure period d122 of the phase-difference pixels, a position such as the average position or middle position of the lens in the exposure period d122 may be used as a representative lens position, and the AF operation process d322 may be conducted.

3-2. Operational Example 2

The above thus references FIG. 10 to describe an operational example 1 in which the readout and output of a focus pixel signal is conducted one time to perform focusing one time, as an operational example of the imaging device 1 according to the present embodiment. Next, an operational example 2 in which the readout and output of a focus pixel signal is conducted multiple times to perform focusing one time will be described with reference to FIG. 11. FIG. 11 is a schematic time chart for explaining an operational example 2 in which, in the imaging device 1 according to the present embodiment, the readout and output of a focus pixel signal is conducted multiple times to perform focusing one time.

FIG. 11 illustrates relationships among a pixel control related to an exposure and readout process for each pixel, an output control related to a process of transmitting pixel signals from the output circuit 180 to the image processing IC 200, phase difference detection related to a focusing process based on pixel signals, an AF operation, and a lens driving control. Note that in FIG. 11, similarly to FIG. 10, the pixel control 1 and the output control 1 are the pixel control and the output control related to the normal pixels used for image generation, while the pixel control 2 and the output control 2 are the pixel control and output control related to the focus pixels used for focusing. Also, in FIG. 11, similarly to FIG. 10, the horizontal axis represents the time direction. Also, in FIG. 11, similarly to FIG. 10, the vertical axis in the pixel control 1, the pixel control 2, the output control 1, and the output control 2 represents the position in the row direction of the pixels that are the output source of the target pixel signal.

The reference signs T21 and T22 illustrated in FIG. 11 denote examples of vertical synchronization signals in the image sensor 100 according to the present embodiment. In addition, the reference signs t1 and t2 are the times at which the shooting process is started, and the period T21 is the shooting interval (the interval during which the exposure of the normal pixels is conducted) from the time t1 to the time t2. For example, the period T21 which is the shooting interval is approximately $1/20$ [s], and the corresponding frame rate is approximately 20 [fps]. Also, the period T22 is approximately $1/120$ [s], and the corresponding frame rate is approximately 120 [fps].

In addition, the reference signs d151 and d152 illustrated in FIG. 11 are similar to the exposure periods d111 and d112 described with reference to FIG. 10. Also, the reference signs d250 to d252 are similar to the output processes d210 to d212 described with reference to FIG. 10. Note that the output process d210 denotes an output process corresponding to the exposure and readout of the normal pixels conducted before the exposure period d111.

In addition, the reference signs d161 to d165 illustrated in FIG. 11 are similar to the exposure periods d121 and d122 described with reference to FIG. 10, but in the example illustrated in FIG. 11, the exposure and readout (exposure period) is conducted multiple times to perform focusing one time. In addition, the reference signs d261 to d265 are similar to the output processes d221 and d222 described with reference to FIG. 10, but in the example illustrated in FIG. 11, the output processes are conducted multiple times to perform focusing one time.

In addition, the reference signs d351 to d355 illustrated in FIG. 11 are similar to the phase difference detection processes d311 and d312 described with reference to FIG. 10, but in the example illustrated in FIG. 11, the phase difference detection processes are conducted multiple times to perform focusing one time, in correspondence with the exposure periods d161 to d165 Similarly, the reference signs d361 to d365 are similar to the AF operation processes d321 and d322 described with reference to FIG. 10, but in the example illustrated in FIG. 11, the AF operation processes are conducted multiple times to perform focusing one time.

In addition, the reference signs d371 and d372 illustrated in FIG. 11 are similar to the lens driving process d331 described with reference to FIG. 10. However, in the example illustrated in FIG. 11, the results of four AF operations from the AF operation processes d361 to d364 are input into one instance of the lens driving process (for example, the lens driving process d371). In the present operational example, the driving control unit 12 issues lens driving instructions using the result of the latest AF operation every time an AF operation process is conducted, even if the lens is currently being driven, thereby making it possible to conduct lens driving control more accurately. As a result, the accuracy of autofocus is improved.

In addition, if attention is paid to the focusing according to the lens driving process d371 illustrated in FIG. 11, the time from the AF operation process d364 until the completion of the lens driving process d371 is smaller than the time from the AF operation process d321 until the completion of the lens driving process d331 illustrated in FIG. 10. This is because in the example of FIG. 11, when driving the lens using the result of the AF operation process d364, the result of the AF operation process d363 (that is, the immediately preceding AF operation process) has already been input and reflected in the lens driving process, and thus the necessary lens driving amount becomes smaller. Herein, it is possible to treat the latency of autofocus as being from the start of the exposure period d164 for rangefinding until the start time of the exposure period d152 in which the autofocus is reflected. Consequently, the present operational example is able to decrease the latency of autofocus.

As above, in the present operational example illustrated in FIG. 11, the focus pixel signal is output multiple times during the period in which the main pixel signal is output one time. Since the image sensor 100 according to the present embodiment is equipped with the frame memory 190, and the frame memory 190 is able to record the main pixel signal, as above, an exposure process and an output process of phase-difference pixels become possible during the input and output of the main pixel signal read out from the frame memory 190. Consequently, it becomes possible to perform an output process, a phase difference detection process, and an AF operation process of the focus pixel signal multiple times to perform focusing one time, thereby decreasing the latency of autofocus while also improving the accuracy of autofocus.

Note that, as illustrated in FIG. 11, since the exposure periods d162, d163, and d164 overlap with the period of the lens driving process d371, a representative lens position may be used in each exposure period to conduct the AF operation processes d362, d363, and d364, as discussed earlier.

4. MODIFICATIONS

The foregoing thus describes an embodiment of the present disclosure. Hereinafter, several modifications of the present embodiment will be described. Note that the modifications described hereinafter may be applied to the present embodiment individually, or applied to the present embodiment in combination with each other. Also, each modification may be applied as a substitute for the configuration described in the present embodiment, or applied in addition to the configuration described in the present embodiment.

<4-2. Modification 2>

The foregoing embodiment describes an example in which the focus detection pixels used for focusing are phase-difference pixels for focusing according to a phase difference technique, but the present technology is not limited to the above example. For example, the focus detection pixels may also be pixels for focusing according to a contrast technique that treats the focus position as being the lens position at which the contrast of the image is increased. In the case of using the contrast technique for focusing, the focus detection pixels may also be normal pixels also usable for image generation. In this case, similarly to Modification 2 discussed later, some of the normal pixels or some lines of the normal pixels may be controlled independently from the remaining pixels. Also, the present technology is applicable even in the case of using a hybrid technique combining the above two techniques of the phase difference technique and the contrast technique as the focusing technique.

<4-2. Modification 2>

The foregoing embodiment describes an example in which the control unit controls pixels so that the readout of a focus pixel signal from the focus detection pixels prearranged in the pixel array unit and the readout of a main pixel signal from the normal pixel used for image generation are conducted independently. However, the present technology is not limited to the above. In the present technology, arbitrary pixels may be read out independently (in advance).

For example, the pixels to read out in advance are not limited to the focus detection pixels. Pixels may also be controlled so that readout and output from some of the normal pixels or some lines of the normal pixels is conducted in advance, whereas the output from the remaining pixels is recorded in the frame memory before being read out and output. By performing the above control, for example, the image processing IC may conduct image analysis or the display unit may display a low-resolution preview image (also called a through-the-lens image) on the basis of a pixel signal output in advance from some of the pixels. According to such a configuration, it is possible to shorten the time from shooting until an analysis or display process is conducted, compared to the case of conducting image analysis or displaying a preview image by reading out all pixels.

In addition, since the independent readout of arbitrary pixels is possible, in the case in which the pixels to be read out in advance are focus detection pixels used for focusing, the arrangement of the focus detection pixels does not have to be predetermined. For example, the focus detection pixels may be specified on the basis of image processing. In this case, the control unit controls pixels so that the readout of a focus pixel signal from the focus detection pixels specified on the basis of image processing and the readout of a main pixel signal are conducted independently. In addition, image processing may be conducted by the image processing unit provided in the image processing IC, and the image sensor receiving the image processing result may specify the focus detection pixels. According to such a configuration, it is sufficient to read out and output in advance only the relevant focus detection pixels specified on the basis of the image processing, and thus the processing time related to the readout and output of the focus detection pixels may be shortened in some cases. Also, according to such a configuration, by specifying the focus detection pixels on the basis of a result of image processing corresponding to the user's goal, it is possible to shoot while keeping in-focus a user-desired area from among the range of shooting by the imaging device.

For example, the above image processing may include a subject tracking process, and the focus detection pixels specified on the basis of the image processing may be pixels corresponding to a subject area specified by the subject tracking process (a detection window used for focusing). According to such a configuration, it is possible to shoot while keeping in-focus a specific subject from among the range of shooting by the imaging device.

For example, the above image processing may include an object detection process, and the focus detection pixels specified on the basis of the image processing may be pixels corresponding to an object area specified by the object detection process (a detection window used for focusing). The object to be detected may be an object such as a person, a face, or a car, for example. According to such a configuration, it is possible to shoot while keeping in-focus a specific object from among the range of shooting by the imaging device.

5. CONCLUSION

As described above, according to an embodiment of the present disclosure, a focus pixel signal may be read out and output from focus detection pixels used for focusing in advance of a main pixel signal from normal pixels, thereby enabling a decrease in the latency of autofocus. In addition, an image sensor according to the present embodiment, by being equipped with frame memory, is able to output a focus pixel signal multiple times during the period of outputting a main pixel signal one time, thereby enabling an increase in the accuracy of autofocus while also enabling a decrease in the latency of autofocus.

It should be understood by those skilled in the art that various modifications, combinations, sub-combinations and alterations may occur depending on design requirements and other factors insofar as they are within the scope of the appended claims or the equivalents thereof.

For example, the foregoing embodiment describes an example of the imaging device electronically controlling the exposure period of each pixel, but the present technology is not limited to such an example. For example, the present technology may be applied to an imaging device equipped with what is called a focal-plane shutter using a mechanical front curtain and rear curtain may be provided, in which the imaging device controls the exposure period of each pixel with the movement of the front curtain and the rear curtain.

In addition, the foregoing embodiment describes an example in which the pixel control of the phase-difference pixels is conducted immediately before the pixel control of the normal pixels (the exposure period during which exposure and readout is conducted), but the present technology is not limited to such an example. For example, in the example of FIG. 10, the pixel control of the phase-difference pixels (exposure period d121) is conducted immediately before the pixel control of the normal pixels (exposure period d111), but the pixel control of the phase-difference pixels may also be conducted after the pixel control of the normal pixels. In particular, if a lens driving process based on the pixel control of the phase-difference pixels conducted after the pixel control of the normal pixels may be completed before the next pixel control of the normal pixels conducted after the first pixel control of the normal pixels, an additional decrease in the latency of autofocus may be obtained.

In addition, the processes in the operational examples of the foregoing embodiment are not strictly limited to being processed in a time series following the sequence described as a time chart herein. For example, the processes in the operational examples of the foregoing embodiment may also be processed in a sequence that differs from the sequences described as a time chart herein, or processed in parallel.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An imaging control device including:

a control unit configured to control pixels in a manner that a readout of a focus pixel signal from a focus detection pixel used for focusing and a readout of a main pixel signal from a pixel used for image generation are conducted independently; and an output unit configured to output the focus pixel signal and the main pixel signal independently from each other.

(2)

The imaging control device according to (1), wherein the focus pixel signal is output multiple times during a period in which the main pixel signal is output one time.

(3)

The imaging control device according to (1) or (2), further including:

frame memory configured to record the main pixel signal, wherein the output unit outputs the main pixel signal recorded in the frame memory.

(4)

The imaging control device according to any one of (1) to (3), further including:

an exposure control unit configured to respectively control exposure of the focus detection pixel and exposure of the pixel used for image generation.

(5)

The imaging control device according to (4), wherein the exposure control unit controls exposure of the focus detection pixel and exposure of the pixel used for image generation in a manner that an exposure time of the focus detection pixel is different from an exposure time of the pixel used for image generation.

(6)

The imaging control device according to any one of (1) to (5), wherein the control unit controls the pixels in a manner that a readout of the focus pixel signal from the focus detection pixel specified based on image processing and a readout of the main pixel signal are conducted independently.

(7)

The imaging control device according to (6), wherein the image processing includes a subject tracking process, and the focus detection pixel specified based on the image processing is a pixel corresponding to a subject area specified by the subject tracking process.

(8)

The imaging control device according to (6) or (7), wherein the image processing includes an object detection process, and the focus detection pixel specified based on the image processing is a pixel corresponding to an object area specified by the object detection process.

(9)

The imaging control device according to any one of (1) to (8), wherein the focus detection pixel is a pixel for focusing according to a phase difference technique.

(10)

An imaging device including:

a control unit configured to control pixels in a manner that a readout of a focus pixel signal from a focus detection pixel used for focusing and a readout of a main pixel signal from a pixel used for image generation are conducted independently;

an output unit configured to output the focus pixel signal and the main pixel signal independently from each other;

an input unit configured to accept, as input, the output focus pixel signal and the output main pixel signal independently from each other; and a lens driving instruction unit configured to issue a lens driving instruction based on the focus pixel signal, in a manner that lens driving is conducted during the input of the main pixel signal.

(11)

An imaging control method including:

controlling pixels in a manner that a readout of a focus pixel signal from a focus detection pixel used for focusing and a readout of a main pixel signal from a pixel used for image generation are conducted independently; and outputting the focus pixel signal and the main pixel signal independently from each other.

(12)

An image sensor including:

circuitry configured to independently provide a readout of a focus detection pixel in a focus pixel signal and a pixel in a main pixel signal, the focus pixel signal is used in an auto focus operation, and the main pixel signal is used to generate an image, and independently output the focus pixel signal and the main pixel signal as separate signals from the image sensor.

(13)

The image sensor according to (12), wherein the circuitry is configured to output the focus pixel signal multiple times during a time period in which the main pixel signal is output once.

(14)

The image sensor according to (12), further comprising:

a frame memory configured to record the main pixel signal, wherein the circuitry is configured to output the main pixel signal recorded in the frame memory.

(15)

The image sensor according to (12), wherein:

the circuitry is further configured to respectively control exposure of the focus detection pixel and exposure of the pixel.

(16)

The image sensor according to (15), wherein an exposure time of the focus detection pixel is different from an exposure time of the pixel.

(17)

The image sensor according to (12), wherein the circuitry is configured to independently control the readout of the focus detection pixel based on image processing demand from the readout of the main pixel signal.

(18)

The image sensor according to (17), wherein the image processing demand includes demand from a subject tracking process, and the focus detection pixel specified based on the image processing demand is a pixel corresponding to a subject area specified by the subject tracking process.

(19)

The image sensor according to (17), wherein the image processing demand includes demand from an object detection process, and the focus detection pixel specified based on the image processing is a pixel corresponding to an object area specified by the object detection process.

(20)

The image sensor according to (12), wherein the focus detection pixel is a phase detection pixel used in an auto focus operation that uses phase difference detection, wherein during a period of time used to readout a portion of the main pixel signal that includes the pixel, the circuitry is configured to readout the focus detection pixel and at least another focus detection pixel from the focus pixel signal.

(21)

The image sensor of (20), wherein during the period of time, a plurality of auto focus operations are performed using the focus detection pixel and the at least another focus detection pixel.

(22)

An imaging device including:

circuitry configured to independently provide a readout of a focus detection pixel in a focus pixel signal and a pixel in a main pixel signal, the focus pixel signal is used in an auto focus operation, and the main pixel signal is used to generate an image, and independently output the focus pixel signal and the main pixel signal as separate signals from the image sensor;

an input interface configured to accept, as input, the focus pixel signal and the main pixel signal independently from each other; and a lens driving controller configured to issue a lens driving instruction based on the focus pixel signal so that lens driving is conducted during the input of the main pixel signal.

(23)

The imaging device according to (22), wherein the circuitry is configured to output the focus pixel signal multiple times during a time period in which the main pixel signal is output once.

(24)

The imaging device according to (22), further comprising:

a frame memory configured to record the main pixel signal, wherein the circuitry is configured to output the main pixel signal recorded in the frame memory.

(25)

The imaging device according to (22), wherein:

the circuitry is further configured to respectively control exposure of the focus detection pixel and exposure of the pixel.

(26)

The imaging device according to (25), wherein an exposure time of the focus detection pixel is different from an exposure time of the pixel.

(27)

The imaging device according to (22), wherein the circuitry is configured to independently control the readout of the focus detection pixel based on image processing demand from the readout of the main pixel signal.

(28)

The imaging device according to (27), wherein the image processing demand includes demand from a subject tracking process, and the focus detection pixel specified based on the image processing demand is a pixel corresponding to a subject area specified by the subject tracking process.

(29)

The imaging device according to (27), wherein the image processing demand includes demand from an object detection process, and the focus detection pixel specified based on the image processing is a pixel corresponding to an object area specified by the object detection process.

(30)

The imaging device according to (22), wherein the focus detection pixel is a phase detection pixel used in an auto focus operation that uses phase difference detection, wherein during a period of time used to readout a portion of the main pixel signal that includes the pixel, the circuitry is configured to readout the focus detection pixel and at least another focus detection pixel from the focus pixel signal, and a plurality of auto focus operations are performed using the focus detection pixel and the at least another focus detection pixel.

(31)

An imaging control method including:

independently providing via circuitry a readout of a focus detection pixel in a focus pixel signal and a pixel in a main pixel signal, the focus pixel signal is used in an auto focus operation, and the main pixel signal is used to generate an image; and independently outputting via the circuitry the focus pixel signal and the main pixel signal as separate signals from the image sensor.

REFERENCE SIGNS LIST 1 imaging device
11 focus lens
12 driving control unit
13 operating unit
14 codec processing unit
15 recording unit
16 display unit
100 image sensor
100-1 pixel chip
100-2 peripheral circuit chip
101 control unit
111 pixel array unit
180 output circuit
190 frame memory
210 image processing unit

The invention claimed is:

1. An image sensor comprising:
a pixel array including normal imaging pixels and focus detection pixels, a frame memory, and circuitry configured to
readout from the focus detection pixels of the pixel array a focus pixel signal,
readout from the normal imaging pixels of the pixel array a main pixel signal representing an image frame and record the image frame in the frame memory based on the main pixel signal, the focus pixel signal being used in an auto focus operation, and the main pixel signal being used to generate an image,
output the focus pixel signal,
output the main pixel signal recorded in the frame memory, wherein the focus pixel signal and the main pixel signal are output independently as separate signals from the pixel array, and
wherein the focus pixel signal is readout from the focus detection pixels of the pixel array and output multiple times during a time period in which the main pixel signal recorded in the frame memory is output once.

2. The image sensor according to claim 1, wherein:
the circuitry is further configured to respectively control exposure of the focus detection pixels and exposure of the normal imaging pixels of the pixel array.

3. The image sensor according to claim 2, wherein an exposure time of the focus detection pixels is different from an exposure time of the normal imaging pixels of the pixel array.

4. The image sensor according to claim 1, wherein the circuitry is configured to independently control the readout of the focus detection pixel based on image processing demand from the readout of the main pixel signal.

5. The image sensor according to claim 4, wherein the image processing demand includes demand from a subject tracking process, and the focus detection pixel specified based on the image processing demand includes a pixel corresponding to a subject area specified by the subject tracking process.

6. The image sensor according to claim 4, wherein the image processing demand includes demand from an object detection process, and the focus detection pixel specified based on the image processing includes a pixel corresponding to an object area specified by the object detection process.

7. The image sensor according to claim 1, wherein the focus detection pixel includes a phase detection pixel used in an auto focus operation that uses phase difference detection, wherein during a period of time used to readout a portion of the main pixel signal that includes the pixel, the circuitry is configured to readout the focus detection pixel and at least another focus detection pixel from the focus pixel signal.

8. The image sensor according to claim 7, wherein during the period of time, a plurality of auto focus operations are performed using the focus detection pixels and the at least another focus detection pixel.

9. An imaging device comprising:
an imaging sensor according to claim 1;
an input interface configured to accept, as input, the focus pixel signal and the main pixel signal independently from each other; and
a lens driving controller configured to issue a lens driving instruction based on the focus pixel signal so that lens driving is conducted during the input of the main pixel signal.

10. An imaging control method comprising:
in a pixel array including normal imaging pixels, focus detection pixels, a frame memory, and circuitry:
reading out, with the circuitry and from the focus detection pixels of the pixel array, a focus pixel signal;
reading out, with circuitry and from the normal imaging pixels of the pixel array, a main pixel signal representing an image frame and record the image frame in a frame memory based on the main pixel signal, the focus pixel signal being used in an auto focus operation, and the main pixel signal being used to generate an image;
outputting the focus pixel signal; and
outputting the main pixel signal recorded in the frame memory, wherein the focus pixel signal and the main pixel signal are output independently as separate signals from the pixel array, wherein the reading out of the focus pixel signal includes reading out of the focus pixel signal from the focus detection pixels of the pixel array multiple times and the outputting of the focus pixel signal includes outputting the focus pixel signal the multiple times during a time period in which the main pixel signal recorded in the frame memory is output once.

11. A digital still camera including the image device according to claim 7.

12. A digital video camera including the image device according to claim 7.

* * * * *